(12) United States Patent
Kouvo et al.

(10) Patent No.: US 9,518,427 B2
(45) Date of Patent: Dec. 13, 2016

(54) MINING VEHICLE AND METHOD FOR ITS ENERGY SUPPLY

(71) Applicant: SANDVIK MINING AND CONSTRUCTION OY, Tampere (FI)

(72) Inventors: Mikko Kouvo, Tampere (FI); Samuli Kouhia, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 136 days.

(21) Appl. No.: 14/503,806

(22) Filed: Oct. 1, 2014

(65) Prior Publication Data

US 2015/0090499 A1     Apr. 2, 2015

(30) Foreign Application Priority Data

Oct. 2, 2013 (EP) ..................................... 13186996

(51) Int. Cl.
*B60L 9/16* (2006.01)
*E21B 7/02* (2006.01)
(Continued)

(52) U.S. Cl.
CPC .................. *E21B 7/025* (2013.01); *B60L 1/00* (2013.01); *B60L 1/003* (2013.01); *B60L 9/24* (2013.01); *B60L 11/005* (2013.01); *B60L 11/1803* (2013.01); *B60L 11/1816* (2013.01); *B60L 11/1838* (2013.01); *E21B 7/022* (2013.01); *B60L 2200/40* (2013.01); *B60L 2220/42* (2013.01); *B60L 2220/54* (2013.01); *Y02T 10/641* (2013.01); *Y02T 10/648* (2013.01); *Y02T 10/7005* (2013.01); *Y02T 10/7022* (2013.01); *Y02T 10/7072* (2013.01);
(Continued)

(58) Field of Classification Search
CPC ................. B60L 1/00; B60L 3/00; B60L 5/00; B60L 5/18–5/20; B60L 9/00; B60L 9/06; B60L 9/16
USPC ...................... 191/2–5, 22 R, 23 R, 33 R, 41
See application file for complete search history.

(56) References Cited

U.S. PATENT DOCUMENTS 8,714,286 B2    5/2014   Kouvo et al.
2005/0276020 A1   12/2005   Ahmad
(Continued)

FOREIGN PATENT DOCUMENTS

DE      102007024200 A1    11/2008
JP      2000-050411 A      2/2000
(Continued)

*Primary Examiner* — R. J. McCarry, Jr.
(74) *Attorney, Agent, or Firm* — Corinne R. Gorski

(57) ABSTRACT

The mining vehicle has a carriage, driving equipment for moving the carriage, at least one mining work device, an electric motor for supplying power to the mining work device, a connection for supplying electric power to the electric motor from an electrical network of the mine, and an energy source. The electric motor has at least a primary stator winding and a secondary stator winding galvanically isolated from each other. When the mining vehicle is connected to the electrical network of the mine via the primary stator winding, the electric motor is arranged, at least for a period of time, to supply power to the at least one mining work device and, at least for a period of the time, to supply power via the secondary stator winding for charging the energy source. A method for energy supply of a mining vehicle is also provided.

12 Claims, 1 Drawing Sheet

(51) Int. Cl.
    *B60L 1/00*      (2006.01)
    *B60L 9/24*      (2006.01)
    *B60L 11/00*     (2006.01)
    *B60L 11/18*     (2006.01)

(52) U.S. Cl.
    CPC ............ *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 2008/0199778 A1 | 8/2008 | Hirata et al. |
| 2011/0224859 A1* | 9/2011 | Pipponen ................ E21B 7/025 701/22 |
| 2013/0206490 A1 | 8/2013 | Kouvo |
| 2014/0365052 A1 | 12/2014 | Kouhia |

FOREIGN PATENT DOCUMENTS

| | | |
|---|---|---|
| JP | 2008-231762 A | 10/2008 |
| JP | 2014-516240 A | 7/2014 |
| JP | 2014-239642 | 12/2014 |
| WO | 2011109050 A2 | 9/2011 |
| WO | 2012167316 A1 | 12/2012 |
| WO | 2013131739 A2 | 9/2013 |

\* cited by examiner

MINING VEHICLE AND METHOD FOR ITS ENERGY SUPPLY

RELATED APPLICATION DATA

This application claims priority under 35 U.S.C. §119 to EP Patent Application No. 13186996.8, filed on Oct. 2, 2013, which the entirety thereof is incorporated herein by reference.

TECHNICAL FIELD/INDUSTRIAL APPLICABILITY

The present disclosure relates to a mining vehicle and to a method for energy supply of a mining vehicle.

BACKGROUND

In mines, rock drilling rigs and other mining vehicles are used to perform operations according to work cycles of mining work devices at pre-planned work sites. After the necessary tasks according to the work cycle, such as borehole drilling, have been performed, the mining vehicle is moved to the next work site and a new work cycle is started. In underground mines, in particular, mining vehicles are generally used, in which driving energy for operations according to the work cycles is electricity from an electrical network of the mine. By contrast, transfer drives between work sites are performed by means of driving energy obtained by using a combustion engine, typically a diesel engine, whereby electric cables or the like do not restrict the transfer drives. However, exhaust gases and noise from a combustion engine cause problems in mines. In addition, a combustion engine requires a lot of space on the carriage of the vehicle and necessitates regular maintenance. A combustion engine also has adverse effects on fire safety of the mine, since it has hot surfaces and it is also necessary to store and handle flammable fuel in the vehicle and the mine.

Mining vehicles that are continuously connected to the electrical network of the mine are also used in mines. Mining vehicles that have an electric motor, and typically an electric motor with a constant rotation speed, are used. Power required by the work phase may then be adjusted with hydraulic components, and the electric motor obtains the electric current and load power defined by the energy consumption of the work phase from the electrical network of the mine. Further, the movement of the mining vehicle is then typically bound to the electrical network or at least to a cable connected thereto and coiled in the mining vehicle or at the fixed electrical network.

U.S. Pat. No. 7,053,568, for example, presents a battery-driven mining vehicle. The publication describes, in particular, the use and positioning of a battery and alternating current motors as components of drive transmission.

U.S. Pat. No. 5,293,947 presents a mining vehicle that receives its electric supply from an overhead busbar system. The mining vehicle also has a switch for selecting whether the energy used by the mining vehicle is taken from the electrical network or from an auxiliary energy source, such as a battery or a diesel motor, in the mining vehicle. When energy is taken from an auxiliary energy source, the mining vehicle can be moved short distances without connecting the mining vehicle to the overhead electrical network.

Application WO 2010/061058 discloses a mining vehicle which is connected to an external electrical network at a work site. An energy storage of the vehicle is charged during a work cycle defined by an excavation plan when the vehicle is at the work site. After this work cycle is performed, electricity obtained from the energy storage is used in a transfer drive.

SUMMARY

It is an aspect of the present disclosure to provide a new type of mining vehicle and a method for its energy supply.

In the presented solution, a mining vehicle includes a carriage, driving equipment for moving the carriage and at least one mining work device. The mining vehicle further includes an electric motor for supplying power to the mining work device, a connection for supplying electric power to the electric motor from an electrical network of the mine, and an energy source. The electric motor has at least a primary stator winding and a secondary stator winding, such that the primary stator winding and the secondary stator winding are galvanically isolated from each other. When the mining vehicle is connected to the electrical network of the mine via the primary stator winding, the electric motor is arranged, at least for a period of time, to supply power to the at least one mining work device and, at least for a period of time, to supply power via the secondary stator winding for charging the energy source. During full power drilling the energy source is preferably not charged, whereby charging the energy source does not raise the maximum power required by the mining vehicle from the electrical network of the mine. The primary stator winding is thus connected to the electrical network of the mine and electric energy supplied via the primary stator winding rotates the rotor of the motor and thereby the shaft of the motor. Thus, the primary winding transforms the electrical power of the electrical network to shaft power of the motor. The secondary winding is used for charging the energy source. This provides an electrical isolation between the electrical network of the mine and the energy source also during charging, whereby an isolation transformer or any other electric means for performing a galvanic isolation is avoided. Thus, the number of components used in the mining vehicle can be minimized.

According to an embodiment, during full power drilling, energy is supplied to the mining work device via the electric motor from both the electrical network of the mine and the energy source of the mining vehicle.

The mining vehicle may include one or more of the following mining work devices: a rock drilling machine, bolting machine, shotcreting device, scaling device, injection device, blasthole charger, loader, dumper, measuring device, or drilling, sealing and propellant feeding equipment used in small-charge excavation. The rock drilling machine may be a face drilling device or a device used in production hole drilling, that is a long-hole drilling device that drills boreholes in a fan shape. The mining work device is an actuator used in handling undetached rock, and it performs several consecutive operations according to a given work cycle.

Typically, several similar operations are performed with the mining work device at one work site. These operations may be defined in an excavation plan, such as a drilling plan, charging plan, or a corresponding mining plan. The mining work device is usually arranged on a boom with which the device is moved during the work cycle. On the other hand, the mining work device may be arranged on a corresponding support or support structure in a mining vehicle, supporting the device during its work cycle.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

In the figures, some embodiments of the invention are shown simplified for the sake of clarity. Similar parts are marked with the same reference numbers in the figures.

DETAILED DESCRIPTION

Figure 1:
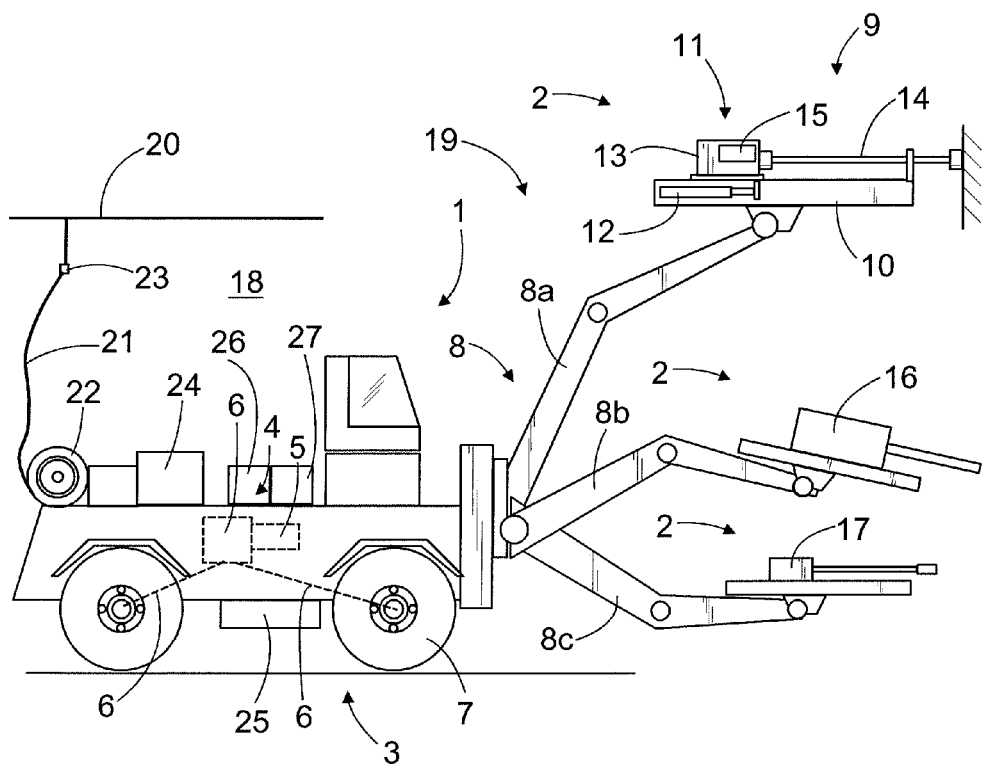
FIG. 1 is a schematic side representation of a mining vehicle, in this case a rock drilling rig.

FIG. 1 shows a rock drilling rig, which is one example of a mining vehicle 1 equipped with one or more mining work devices 2. The rock drilling rig includes a carriage 3 that may be moved by means of drive equipment 4. The drive equipment 4 has one or more drive motors 5 and one or more power transmission means 6 for transmitting drive power to one or more wheels 7. The drive power transmission may include a mechanical gear system and mechanical power transmission members or, alternatively, the drive power transmission may be hydraulic or electric. There may be one or more booms 8 arranged on the carriage 3, and the boom may be equipped with a mining work device 2.

In the embodiment shown in FIG. 1, the first boom 8a is a drilling boom, at the outermost end of which there is a rock drilling unit 9 having a feed beam 10, along which a rock drilling machine 11 can be moved by means of a feed device 12. The rock drilling machine 11 may include a percussion device 13 for generating impact pulses on a tool and a rotating device 15 for rotating the tool 14 around its longitudinal axis. There may be several of these drilling booms 8a in the rock drilling rig.

By way of example, a second boom 8b is shown to include a bolting device 16, with which rock bolts can be arranged in pre-drilled boreholes to support the excavated rock cavern. In the embodiment of FIG. 1, a third boom 8c is equipped with a measuring device 17 for measuring drilled boreholes. Other alternative mining work devices 2 include injection devices used in feeding sealing material into rock, shotcrete processing devices, scaling equipment, devices used in small-charge excavation, and devices for feeding explosives.

The mining vehicle 1 is run in accordance with the excavation plan of the mine 18, or a corresponding pre-drafted plan, to a work site 19 where the mining work device 2 performs operations according to the work cycle, which takes a relatively long time. For instance, the work cycle of a rock drilling machine may include drilling several boreholes defined in the drilling plan at the work site 19. Further, drilling of each borehole typically consists of several work phases, such as collaring, actual drilling, changing extension rods and drill bits, and dismantling extension rod equipment after drilling. Performing a drilling work cycle at the work site 19 may take several hours, sometimes even an entire work shift. Correspondingly, charging, bolting, measuring, and injecting are often quite time-consuming operations. Generally, the use of a mining work device 2 has to do with drilling a borehole or further processing a finished hole. This then means handling undetached rock.

FIG. 1 further shows that the mine 18 has an electrical network 20 that may be fixedly constructed or it may consist of a modifiable network. The electrical network 20 is typically a three-phase alternating current network. When the mining vehicle 1 is at the work site 19, its mining work device 2, hydraulic system and any necessary auxiliary systems are mainly driven by electrical energy obtained from an external electrical network. The mining vehicle 1 may be connected to the electrical network 20 with one or more connection cables 21. The connection cable 21 may be arranged on a reel 22 and it may be equipped with a suitable connector 23 that may be connected to the supply terminal of the electrical network 20. Alternatively, the reel 22 and the cable 21 may be arranged in the mine 18, and the connection cable 21 is connected to the mining vehicle 1. The mining vehicle 1 comprises an electric motor 26, which is connected via a connecting device 24 to the electrical network. In the mining vehicle 1, hydraulic pressure is produced by a hydraulic pump 27. The hydraulic pump is rotated by the electric motor.

The mining vehicle 1 is equipped with a connecting device 24, through which the electricity supplied from the electrical network 20 is connected to different devices of the mining vehicle 1. The mining vehicle 1 is also equipped with at least one energy source 25. The energy source 25 may be a battery, a supercapacitor or their combination, for example, or any other suitable energy source that may be charged.

Figure 2:
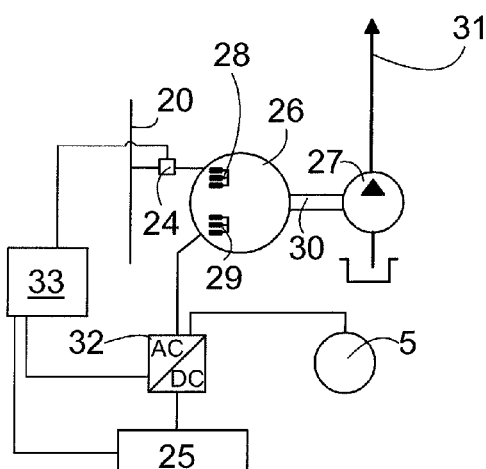
FIG. 2 is a diagram of an energy supply arrangement of a mining vehicle.

FIG. 2 shows some parts of the mining vehicle schematically. The electric motor 26 is connected to the electrical network 20. The electric motor 26 rotates the hydraulic pump 27. The electric motor 26 has a primary stator winding 28 and a secondary stator winding 29. The primary stator winding 28 and the secondary stator winding 29 are galvanically isolated from each other.

The electric motor 26 also includes a shaft 30. The electric motor 26 is connected to the electrical network of the mine 20 such that the primary stator winding 28 is connected to the electrical network of the mine 20. When electric energy is supplied from the electrical network of the mine 20 to the electric motor 26, the rotor of the electric motor is rotated. The shaft 30 is connected to the rotor of the electric motor 26, and thereby the electric energy from the electrical network of the mine 20 rotates the shaft 30.

The shaft 30 is connected to rotate the hydraulic pump 27. When rotated the hydraulic pump 27 produces hydraulic pressure to the hydraulic system of the mining vehicle. The hydraulic system of the mining vehicle is denoted by reference numeral 31.

The hydraulic pressure in the hydraulic system 31 is used for supplying power to the mining work devices 2, for example. The hydraulic pressure may also be used for driving a hydraulic system of the driving equipment, such as steering and braking, for example.

The energy source 25 is connected by an inverter 32 to the secondary stator winding 29 of the electric motor 26. The energy source 25 is also connected to the drive motor 5. The energy source 25 may be connected to the drive motor 5 via the same inverter 32 or there may be a separate inverter between the energy source 25 and the drive motor 5. Energy from the energy source 25 may thus be used for the transfer drive of the mining vehicle 1, for example.

During full power drilling, for example, it is also possible to supply energy from the energy source 25 to the mining work device 2, whereby boost mode is achieved. Thus, in boost mode, energy is supplied to the mining work device from the electrical network of the mine 20 and from the energy source 25. Thus, during boost mode, the load of the electric motor 26 to the electrical network of the mine 20 may be decreased by simultaneously supplying energy to the mining work device from the energy source 25.

It is also possible to supply energy to the mining work device 2 from the energy source 25 only. Thus, so-called low power drilling could be achieved even if the electrical network of the mine 20 is not able to supply energy, for example.

The energy source 25 may be charged by supplying energy from the electrical network of the mine 20 via the primary stator winding 28 and the secondary stator winding 29. The electrical network of the mine 20 and the energy source 25 need to be galvanically isolated from each other. Because the primary stator winding 28 and the secondary stator winding 29 are galvanically isolated from each other the electrical network of the mine and the energy source 25 are galvanically isolated from each other also during charging.

Preferably, the charging of the energy source 25 is performed when the power requirement of the mining work device 2 during the work cycle is low. During charging mode it is possible to supply electric energy via the primary stator winding 28 only to the secondary stator winding 29 or, alternatively, the electric power supplied via the primary stator winding 28 may be used partly for rotating the shaft 30 and partly for supplying charging power via the secondary stator winding 29.

The control of the system may be performed by controlling the inverter 32, whereby a stepless control from 0% to 100% may be achieved.

FIG. 2 also shows a control unit 33 schematically. The control unit 33 is arranged to control the devices to perform the operations described above.

A separate drive motor 5 is not necessarily needed but the electric motor 26 may produce the drive power needed. Thus, in that case the power transmission means 6 are connected to the shaft 30 of the electric motor 26.

The mining vehicle 1 may have one or more electric motors 26. The mining vehicle 1 may also have one or more hydraulic pumps 27. The electric motor 26 may rotate one or more hydraulic pumps 27, or each hydraulic motor 27 may have an electric motor of its own.

The above described solution may also be implemented without the hydraulic pump 27. Thus, in such case instead of the hydraulic pump 27, the electric motor 26 may be connected to a water pump or a compressor, for example. It should be mentioned that, in this specification, a mine refers to underground mines and opencast mines. Further, the method and the mining vehicle may be used at contract work sites, for example when excavating different rock facilities. Therefore, a contract work site may also be considered a type of mine. At contract work sites, an external electrical network may be modifiable, such as an aggregate on a movable carriage.

In some cases, the features described in this specification may be used as such, regardless of other features. On the other hand, the features described in this specification may also be combined to provide various combinations as necessary.

The drawings and the related description are only intended to illustrate the idea of the invention. The invention may vary in its details within the scope of the claims.

It will be obvious to a person skilled in the art that, as technology advances, the inventive concept can be implemented in various ways. The invention and its embodiments are not limited to the examples described above but may vary within the scope of the claims.

The invention claimed is:

1. A mining vehicle comprising:
a carriage;
driving equipment for moving the carriage;
at least one mining work device;
at least one electric motor for supplying power to the mining work device;
a connection for supplying electric power to the electric motor from an electrical network of the mine; and
an energy source, wherein the electric motor includes at least a primary stator winding and a secondary stator winding, the primary stator winding and the secondary stator winding being galvanically isolated from each other, and when the mining vehicle is connected to the electrical network of the mine via the primary stator winding, the electric motor is arranged, at least for a period of time, to supply power to the at least one mining work device and, at least for a period of time, to supply power via the secondary stator winding for charging the energy source, wherein the electrical network of the mine and the energy source are galvanically isolated from each other.

2. A mining vehicle as claimed in claim 1, wherein the electric motor includes a rotor and a shaft connected to the rotor, wherein electric energy supplied via the primary stator winding is arranged, at least for a period of time, to rotate the rotor and thereby the shaft.

3. A mining vehicle as claimed in claim 2, further comprising a hydraulic pump for supplying hydraulic pressure to the mining work device, wherein the shaft is arranged to rotate the hydraulic pump.

4. A mining vehicle as claimed in claim 1, further comprising a control unit arranged to control charging of the energy source which is to be performed when maximum power is not supplied to the mining work device.

5. A mining vehicle as claimed in claim 1, further comprising a control unit arranged to control charging of the energy source which is to be performed simultaneously with supplying of power to the mining work device.

6. A mining vehicle as claimed in claim 1, further comprising a control unit arranged to control supply of energy to the mining work device simultaneously from both the electrical network of the mine and the energy source of the mining vehicle at least for a period of time.

7. A method for energy supply of a mining vehicle, the method comprising charging an energy source of the mining vehicle, the mining vehicle including a carriage, driving equipment for moving the carriage, at least one mining work device, at least one electric motor for supplying power to the mining work device, a connection for supplying electric power to the electric motor from an electrical network of the mine, and the energy source, wherein the electric motor includes at least a primary stator winding and a secondary stator winding, the primary stator winding and the secondary stator winding being galvanically isolated from each other such that the electrical network of the mine and the energy source are galvanically isolated from each other and wherein, when the mining vehicle is connected to the electrical network of the mine via the primary stator winding, the electric motor supplies, at least for a period of time, power to the at least one mining work device and supplies, at least for a period of time, power via the secondary stator winding, thereby charging the energy source.

8. A method as claimed in claim 7, wherein charging of the energy source is performed when maximum power is not supplied to the mining work device.

9. A method as claimed in claim 7, wherein charging of the energy source is performed simultaneously with supplying of power to the mining work device.

10. A method as claimed in claim 7, wherein, at least for a period of time, energy is supplied to the mining work device simultaneously from both the electrical network of the mine and the energy source of the mining vehicle.

11. A mining vehicle as claimed in claim 1, wherein only the primary stator winding and the secondary stator winding are galvanically isolated.

12. A method as claimed in claim 7, wherein only the primary stator winding and the secondary stator winding are galvanically isolated from each other to galvanically isolate the electrical network of the mine and the energy source.

\* \* \* \* \*